UNITED STATES PATENT OFFICE.

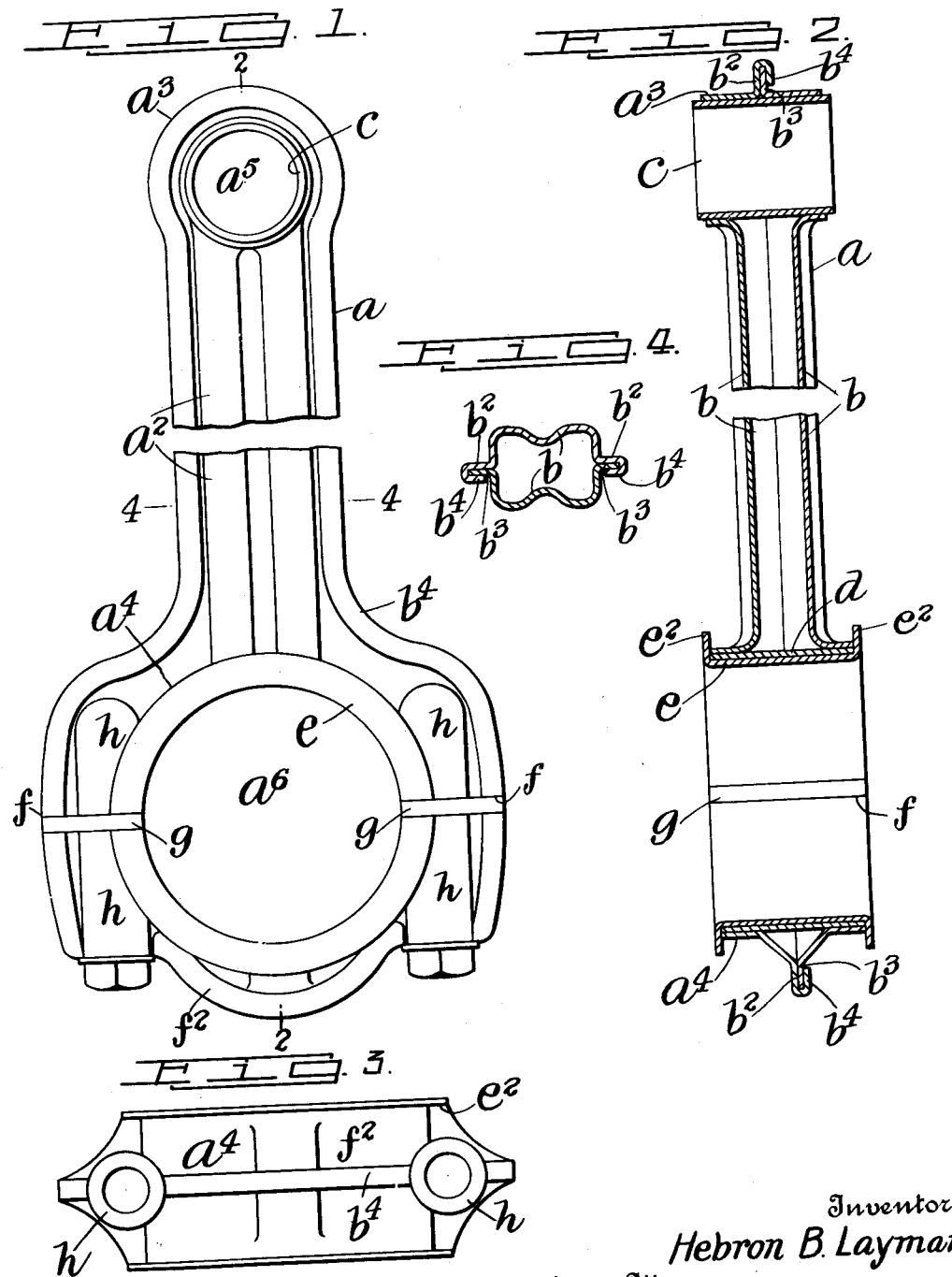

HEBRON B. LAYMAN, OF NEW YORK, N. Y., ASSIGNOR TO THE LAYMAN PRESSED ROD CO., INC., OF NEW YORK, N. Y., A CORPORATION OF NEW YORK.

CONNECTING-ROD.

1,176,304.

Specification of Letters Patent.   Patented Mar. 21, 1916.

Application filed August 9, 1915.   Serial No. 44,437.

*To all whom it may concern:*

Be it known that I, HEBRON B. LAYMAN, a citizen of the United States, and residing at New York, in the county of New York and State of New York, have invented certain new and useful Improvements in Connecting-Rods, of which the following is a specification, such as will enable those skilled in the art to which it appertains to make and use the same.

This invention relates to connecting rods, and particularly to devices of its class, made from or composed of sheet metal, and the object thereof is to provide an improved device of this class, which is composed of two separate longitudinal parts, and the invention consists particularly in the method of securing said parts together, as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of the connecting rod, made according to my invention; Fig. 2 a section in the line 2—2 of Fig. 1; Fig. 3 a bottom plan view of the device, as shown in Fig. 1; and, Fig. 4 a cross section of the line 4—4 of Fig. 1.

In the practice of my invention, I provide a connecting rod $a$, comprising a shank portion $a^2$, a smaller end portion $a^3$, and a larger end portion $a^4$, said end or head portions being provided respectively with the usual apertures or openings $a^5$ and $a^6$, to receive the piston pin and crank shaft of an engine.

The rod $a$ consists of two similar parts $b$, provided with abutting flanges $b^2$ and $b^3$, and the invention consists in elongating the abutting flanges $b^2$, to form an extension $b^4$ thereof, which in the operation of securing the two parts $b$ of the rod $a$ together, are folded over the flange members $b^3$, as clearly shown in Fig. 4, and the said flanges $b^2$ and $b^3$, including the extensions $b^4$, extend entirely around the rod $a$, as clearly shown in full lines in Fig. 1.

The smaller end portion $a^3$ of the rod $a$ is provided with the usual sleeve bearing $c$, while the larger end portion $a^4$ of said rod is provided with a sleeve bearing $d$, and the sleeve bearings $c$ and $d$ are secured to the corresponding end portions of the rod $a$ by welding, brazing, or in any other way, and secured in the larger end portion $a^4$ are other sleeve bearings $e$, provided with end flanges $e^2$. The larger end or head portion $a^4$ is cut, sawed, or otherwise divided transversely, as shown at $f$, to form a cap $f^2$, and placed between the abutting faces of the rod proper and the cap $f^2$ in the construction shown, are shims $g$. The larger end or head portions $a^4$, including the cap $f^2$, are also provided with bolt bosses $h$, to receive bolts for securing said cap $f^2$ to the rod proper, as will be readily understood, and in the usual manner.

It will be understood that my invention is not limited to the specific form or construction of the rod $a$, or the end or head portions $a^3$ and $a^4$ thereof, as said invention consists simply in the method of connecting the separate parts of a rod composed of two similar parts, said means consisting in extending the flanges of one of the parts and folding them over the corresponding flanges of the other part, as clearly shown and described, nor is my invention necessarily limited to extending said overlapping flange entirely around said rod, and other changes in, and modifications of the form of the various parts of my improved rod may be made within the scope of the appended claims, without departing from the spirit of my invention or sacrificing its advantages.

Having fully described my invention, what I claim as new and desire to secure by Letters Patent, is:—

1. In a connecting rod, a shank portion composed of a plurality of parts one of which embraces another, and a crank end portion composed of separate parts having bolt bosses formed thereby and therebetween.

2. In a connecting rod, a shank portion composed of a plurality of parts one of which embraces another, and a crank end portion having a cap composed of parts having bolt bosses formed thereby and therebetween.

3. A connecting rod having a crank end portion provided with a cap and composed of a plurality of sheet metal parts one of which embraces another, and means inserted between said parts for securing the cap to the rod.

4. In a connecting rod, a shank portion and a crank end portion composed of a plurality of parts one of which embraces another, said crank end portion being provided with a cap, and means inserted between said parts for securing the cap to the rod.

5. A connecting rod having a crank end portion composed of a plurality of parts one of which embraces another, said parts being provided with bolt bosses formed thereby and therebetween.

6. A connecting rod having a crank end portion composed of a plurality of parts one of which embraces another, and a cap cut from the crank end portion, the cap and the other part of the crank end portion being provided with bolt bosses formed thereby and therebetween.

7. In a connecting rod, a shank portion and a crank end portion composed of two similar parts provided with abutting flanges one of which is extended and folded over the other, and a cap cut from said crank end portion, the separate parts of the crank end portion being provided with bolt bosses formed thereby and therebetween.

8. A connecting rod having a cap, composed of a plurality of parts, one of which embraces another.

9. A connecting rod having a crank end portion provided with a cap composed of substantially similar parts one of which embraces another, said cap and the remaining part of the crank end portion being provided with bolt bosses formed thereby and therebetween.

10. A connecting rod having a crank end portion composed of a plurality of parts one of which embraces another, said crank end portion being provided with a cap, and said cap and the remaining part of the crank end portion being provided with bolt bosses formed thereby and therebetween.

In testimony that I claim the foregoing as my invention I have signed my name in presence of the subscribing witnesses this 4th day of August, 1915.

HEBRON B. LAYMAN.

Witnesses:
M. BOCKELMAN,
H. E. THOMPSON.